Oct. 4, 1927.
C. A. MOORE
1,644,073
REFRIGERATING APPLIANCE
Filed Aug. 30, 1924
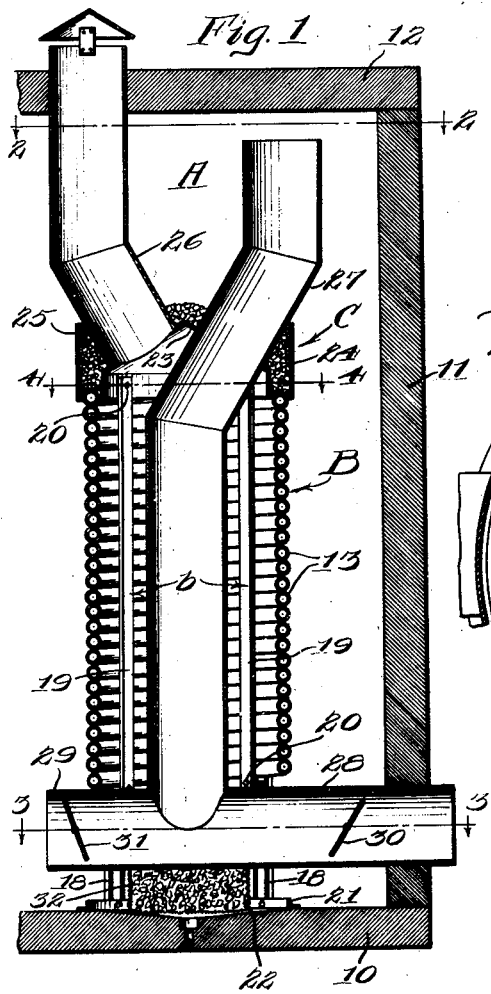
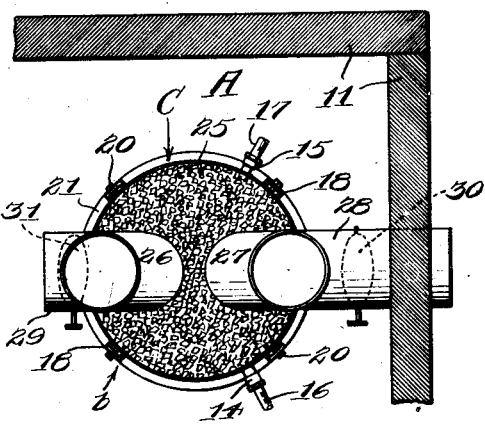
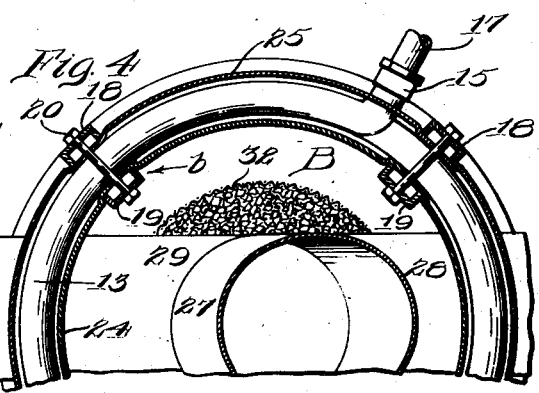
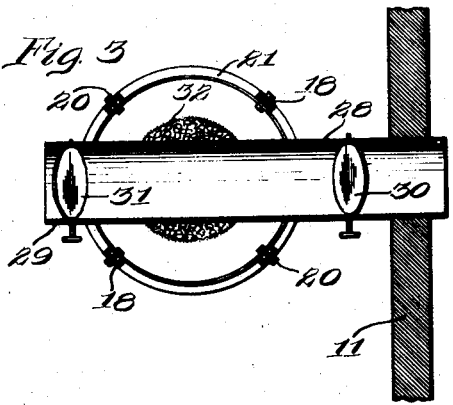
Inventor
Charles A. Moore
By Bradbury + Caswell
Attorneys Patented Oct. 4, 1927.

1,644,073

UNITED STATES PATENT OFFICE.

CHARLES A. MOORE, OF ST. PAUL, MINNESOTA.

REFRIGERATING APPLIANCE.

Application filed August 30, 1924. Serial No. 735,057.

My invention relates to improvements in refrigerating appliances.

An object of the invention is to provide a simple, durable and efficient appliance of the instant nature, wherein novel provision is made to prevent frost from accumulating on the air refrigerating elements.

Another object is to provide in an appliance, as above, means for dehumidifying air chilled by a refrigerating element kept free from frost, as provided.

With the foregoing and other objects in view, which will appear in the following description, the invention resides in the novel combination and arrangement of parts and in the details of construction hereinafter described and claimed.

In the drawings Fig. 1 is a longitudinal central sectional view of an appliance embodying my invention, the same being shown as installed in a storage chamber; Figs. 2 and 3 are transverse sectional views taken respectively on the lines 2—2 and 3—3 of Fig. 1, and Fig. 4 is an enlarged fragmentary sectional view taken on the line 4—4 of said Fig. 1.

Referring to the drawings, it will be seen that the floor 10, walls 11 and ceiling 12 enclose a chamber A. Within this chamber, I have illustrated an appliance embodying my invention. The body of this appliance constitutes an upright air duct B the same consisting of a pipe 13 coiled turn upon turn, as shown, said pipe being supplied at its lower and upper ends with fittings 14, 15 for connection, respectively, with feed and return pipes 16, 17 for a suitable refrigerating medium. The coiled pipe structure is supported and bound within spaced composite uprights b, each upright consisting of a pair of channel irons 18, 19, one within the pipe coil and the other outside of the same, said channel irons being tied together and clamped against the pipe 13 from either side thereof by means of bolts 20. The outer channel irons 18, which reach considerably beneath the duct B, rest upon a ringlike base 21 seated on the floor 10 over a drain 22. The duct B being thus supported with the lower end thereof above the floor 10, allows for the egress of air from said duct at the lower portion of the chamber. Carried by the uprights b in position superimposing the duct B is a hopper C consisting of a cone-like member 23 formed with a depending annular flange 24 at the margin thereof and an annular retaining wall 25 encircling said member. The bolts 20, reaching through the upper ends of the channel irons 18, 19, pass through said flange 24 and wall 25 (Fig. 4) binding the flange 24 between the inner sides of the upper turn of the pipe 13 and the inner channel irons 19 and binding the wall 25 between the outside of said upper turn of said pipe 13 and the outer channel irons 18. Between the uprights b, the lower portions of the flange 24 and wall 25 are separated slightly from their respective sides of the upper turn of the pipe 13 (Fig. 4). Thus, it will be seen that the annular delivery opening of the hopper C, which is formed by the space between the flange 24 and wall 25, is restricted, but not entirely blocked, by the upper turn of the pipe 13. The cone-like member 23, in addition to forming the bottom of the hopper C, constitutes a cap for the duct B. An ingress pipe 26 connecting with the member 23 and communicating with the duct B leads upwardly from said member 23 through the ceiling 12 into the outer air. An egress pipe 27, having communication at its upper end with the chamber A at the upper portion of said chamber, extends downward through the member 23 and duct B, horizontal branches 28, 29 respectively fitted with dampers 30, 31 being provided at the lower end of said pipe 27. The branch 28 reaches through a wall 11 of the chamber A into the outer atmosphere and the shorter branch 29 extends into the chamber A.

Seated over the drain 22, axially of the duct B, is a basket 32 or other suitable perforated container.

In use, a refrigerating medium is passed through the pipe 13. The chilling of the air within the duct B and within the pipe 27 causes the ingress of air into the chamber A through the duct 26 and the egress of air from said chamber through the pipe 27, the damper 30 in the branch 28 being open. Continued use of the appliance, under certain conditions, would result in detrimental accumulations of frost on the pipe 13 in the absence of any provision for preventing the same. I avoid such accumulations of frost and thereby maintain the appliance at its highest efficiency by placing calcium chloride in granular form in the hopper C. Condensation on the upper turn of the pipe 13 dissolves the calcium chloride presented thereto by the hopper C and the mixture creeps down the sides, inside and out, of the coiled pipe structure. This action results in the constant application of the calcium chloride solution to the outer surfaces of the pipe 13 from top to bottom of the duct B, which non-freezing solution prevents the formation of frost on said coiled pipe 13. Dripping from the lower turn of the pipe 13, the solution falls into the drain 22 in the floor 10. The incoming air is increased in percentage of humidity by contact with the inner moist wall of the duct B, but since it is desirable at times to introduce relatively dry cold air into a cold storage chamber, I make appropriate provision therefor. Such provision is made by use of a quantity of calcium chloride placed in the basket 32, which rests in the path of the air flowing into the chamber A from the duct B. Having a strong affinity for moisture the calcium chloride in the basket 32 absorbs a considerable percentage of the moisture in the air entering the chamber A from the duct B.

Changes in the specific form of my invention, as herein disclosed, may be made within the scope of what is claimed without departing from the spirit of my invention.

Having described my invention, what I claim as new and desire to protect by Letters Patent is:

1. In an appliance of the class described, an upright airduct embodying in the wall thereof a container for a refrigerant, a hopper arranged to feed a defrosting material onto the upper portion of the duct container wall, said hopper including a cone-like member constituting a combined duct cap and hopper bottom and also including a sidewall spaced apart from said member to form a delivery opening for said hopper, said opening being restricted by said upper portion of the duct container wall, an air ingress pipe connecting with said cone-like hopper member, and a basket for a moisture absorbing material located at the lower end of the duct and in the path of air having egress from said duct.

2. In an appliance of the class described, an upright hollow structure forming an air duct and comprising a container for a refrigerant, and a hopper for defrosting material surmounting said container structure, the upper portion of said structure serving to restrict the delivery opening in said hopper without completely closing the same either at the inside or outside of said structure.

3. In an appliance of the class described, an upright tubular air duct comprising a pipe for a refrigerant coiled turn upon turn, and a hopper for defrosting material surmounting said duct structure and having a circular delivery opening for discharging the hopper contents onto the upper turn of said coiled pipe, said upper turn of said pipe serving to restrict the delivery opening in the hopper.

4. In an appliance of the class described, an upright air duct, said duct comprising in the wall thereof a container for a refrigerant, and a combined duct cap and hopper the same being adapted to feed a defrosting material onto the upper portion of the duct container wall.

5. In combination, an upright container structure for a refrigerant, a hopper including a member disposed in respect to said structure to provide a restricted space along one side of the upper portion of said structure between the lower edge of said hopper member and said portion of said structure, whereby a diminishing quantity of solid, soluble, defrosting material in said hopper is held to the last of its supply in contact with said structure, and whereby material dissolved by such contact is permitted to flow down the side of said structure through said space.

In testimony whereof, I have signed my name to this specification.

CHARLES A. MOORE.